US008002846B2

United States Patent
Huang et al.

(10) Patent No.: US 8,002,846 B2
(45) Date of Patent: Aug. 23, 2011

(54) METHOD FOR MANUFACTURING PROTEIN FILLING AGENT FOR LEATHER UTILIZING ANIMAL HAIRS

(75) Inventors: Hai-Guang Huang, Foshan (CN); Hai-Xia Wang, Foshan (CN); Guo-Ying Li, Chengdu (CN); Wen-Tao Liu, Chengdu (CN)

(73) Assignees: Sichuan University, Chengdu, Sichuan (CN); Foshan City Nanhai Zhaofu Leather Product Co., Ltd, Foshan, Guangdong (CN)

( * ) Notice: Subject to any disclaimer, the term of this patent is extended or adjusted under 35 U.S.C. 154(b) by 233 days.

(21) Appl. No.: 12/432,479

(22) Filed: Apr. 29, 2009

(65) Prior Publication Data

US 2009/0265861 A1    Oct. 29, 2009

(30) Foreign Application Priority Data

Apr. 29, 2008    (CN) .......................... 2008 1 0044317

(51) Int. Cl.
*C14C 1/00*    (2006.01)
*C14C 1/08*    (2006.01)
*C14C 3/00*    (2006.01)
*C14C 9/00*    (2006.01)

(52) U.S. Cl. ....................... 8/94.15; 8/94.19 R; 252/8.57

(58) Field of Classification Search .................. 8/94.18, 8/94.15, 94.19 R; 252/8.57
See application file for complete search history.

(56) References Cited

U.S. PATENT DOCUMENTS 2,005,746 A * 6/1935 Kritchevsky ...................... 162/2
5,306,435 A * 4/1994 Ishikawa et al. .............. 252/8.57

* cited by examiner

*Primary Examiner* — Lorna M Douyon
*Assistant Examiner* — Tanisha Diggs
(74) *Attorney, Agent, or Firm* — Pai Patent & Trademark Law Firm; Chao-Chang David Pai

(57) ABSTRACT

Method for manufacturing a protein filling agent for leather utilizing animal hairs. The method includes pre-treating the animal hairs to obtain pre-treated animal hairs, wherein the pre-treating comprises soaking the animal hairs in an inorganic acid solution and a reducing agent solution. Next, the pre-treated hairs are hydrolyzed in an alkaline compound to obtain a viscous liquid and then, neutralized and dried to obtain the protein filling agent for leather.

8 Claims, No Drawings

METHOD FOR MANUFACTURING PROTEIN FILLING AGENT FOR LEATHER UTILIZING ANIMAL HAIRS

CROSS REFERENCE TO RELATED APPLICATIONS

This Application claims priority of China Patent Application No. 200810044317, filed on Apr. 29, 2008, the entirety of which is incorporated by reference herein.

BACKGROUND OF THE INVENTION

1. Field of the Invention

The present invention relates to the recycling of hairs, and in particular relates to a method for manufacturing a protein filling agent utilizing animal hairs.

2. Description of the Related Art

Generally, the hair-saving and hair-destroying dehairing processes are carried out in leather industry. However, the wastewater containing sulfur of leather industry is mainly produced from hair-destroying dehairing process, wherein the COD content is more than 10000 mg/L which accounts for 40% of total COD in wastewater, and the sulfur contain is more than 5500 mg/L which accounts for 90% of total sulfur in wastewater. Thus, the hair-destroying dehairing process should be replaced with hair-saving dehairing process to solve the problems of industrial pollution. However, vast cut hairs would be produced in hair-saving dehairing process. The treatment of unnecessary hairs would increase the manufacturing costs so that the hair-saving dehairing process cannot be popularly used. Therefore, it is important for utilizing the waste hairs from hair-saving dehairing process.

Event thought the proposition of hair-saving dehairing process still is small in leather industry, it is more and more significant. The reasons include: 1. Environmental protection awareness of human is on the increase and environmental protection laws and regulations of countries is more stringent, so that the replacement of hair-destroying dehairing process with hair-saving dehairing process is imperative. 2. In contrast to hair-destroying dehairing process, the hair-saving dehairing process can significantly decrease the cost of wastewater treatment. If the problem of waste hairs can be solved, the cut hairs obtained from hair-saving dehairing process would produce a huge economic benefit. Thus, a novel method to reusing waste hair is needed in leather industry.

Currently, recycling of hairs is utilized for wool and pig hairs. Wool can be made a carpet and has a superior spinnability. However, because the ability for wool to be spun is hindered after being recycled, the cut wool only be made a carpet or discarded. Pig hair has a superior hardness and breaking strength so that pig hair can be made a brush. However, for pig hairs, because characteristics for pig hairs like hardness and strength, after being recycled is decreased, the efficient methods and manufacturing of the cattle hairs have yet to be disclosed. Thus, the hair-saving dehairing process is desired, wherein hair may be feasibly recycled and utilized without increasing pollutants.

BRIEF SUMMARY OF THE INVENTION

The invention provides a method for recycling waste animal hairs based on the hair-saving dehairing process. Animal hairs are hydrolyzed to form a protein filling agent, and the protein filling agent can be recycled and used in the leather industry to reduce the cost of the hair-saving dehairing processes and simplify the treatment of the tannery wastewater, simultaneously.

The invention is achieved by the process as follows as, wherein all compositions of the invention are represented by part by weight unless otherwise indicated.

In first aspect of the invention, the invention provides a method for manufacturing a protein filling agent for leather utilizing animal hairs, comprising:

(1) pre-treating the animal hair to obtain a pre-treated animal hair, wherein the pre-treating comprises soaking the animal hair in an inorganic acid solution and a reducing agent solution;

(2) hydrolyzing the pre-treated hair of step (1) with an alkaline compound to obtain a viscous liquid; and (3) neutralizing and drying the viscous liquid of step (2) to obtain the protein filling agent for leather.

In second aspect of the invention, the invention provides a method for tanning hides, wherein the protein filling agent of the invention is used to fill and re-tan hides.

In third aspect of the invention, the invention also provides a protein filling agent for leather prepared by the method of the invention.

In one embodiment, the method of manufacturing protein filling agent by animal hairs for leather, comprising:

(1) washing the animal hair with water; soaking the animal hairs in a sufficient volume of 0.01-0.5 M inorganic acid solution for 10-48 hours; washing the animal hair with water until the animal hair having a neutral pH level; draining off the water and drying; obtaining 600 part by weight of the animal hair; soaking the animal hairs in a sufficient volume of a 2-30 wt % reducing agent for 10-48 hours; and draining off the water and drying, subsequently;

(2) adding the pre-treated hair to a reactor with a stirrer, thermometer, and reflux condenser; and adding a sufficient volume of 0.5-20 wt % alkaline solution at 50-95° C. for 2-20 hours to obtain a viscous liquid; and (3) cooling the viscous liquid and adjusting the pH level to 5-8 by a inorganic solution to obtain a filtrate of 10-20% solid content with keratin; and concentrating and drying the filtrate to obtain the protein filling agent for leather.

Animal hairs refer to recycled cattle hairs, wools, or pig hairs obtained from hair-saving dehairing processes.

The inorganic acid may comprise hydrochloric acid or sulfuric acid.

The reducing agent may comprise sulfhydryl ethanol, sulfhydryl sodium acetate, $Na_2S_2O_3$, $NaHSO_3$, or $Na_2SO_3$.

The alkaline compound may comprise MgO, CaO, NaOH, KOH, $Na_2CO_3$, or $NaHCO_3$.

A detailed description is given in the following embodiments with reference to the accompanying drawings.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

In the invention, animal hairs are hydrolyzed to form a protein filling agent, and the protein filling agent can be recycled and used in the leather industry to solve the problem of replacement of hair-destroying dehairing process with hair-saving dehairing processes and simplify the treatment of the tannery wastewater, simultaneously.

The term "animal hair" as used herein, refers to any natural hair capable of tanning. The animal hairs may be cattle hairs, wool, pig hairs, or a combination thereof. Preferably, the animal hair may be obtained by the hair-saving dehairing processes. The animal hairs are recycled cattle hairs, wool, or pig hairs, or a combination thereof obtained by the hair-saving dehairing process. In one embodiment, the animal hairs are recycled cattle hairs.

The term "hair-saving dehairing processes" as used herein is well-known for one skilled in the art. One skilled in the art will select the appropriate process and technique to achieve the invention and the invention is not limited thereto. The hair-saving dehairing process includes, but is not limited to, hair-saving dehairing in a drum, enzyme dehairing, or dehairing by a machine. In one embodiment, the hair-saving dehairing process includes using a hair protecting agent, calcium hydroxide, to protect the hair, treating the hair follicles with a strong alkaline material and reducing agent to damage the hair rolls, and then molting and obtaining the loosed hair.

In order to solve the problem of the environment pollution from hair-destroying dehairing process and accumulation of cut hair from hair-saving dehairing, the invention provides a novel method to recycle the cut hair.

In one embodiment, the invention provides a method of manufacturing protein filling agent by animal hairs for leather. The method includes:

(1) pre-treating the animal hairs to obtain a pre-treated animal hair, wherein the pre-treating comprises soaking the animal hairs in an inorganic acid solution and a reducing agent solution;

(2) hydrolyzing the pre-treated hair of step (1) with an alkaline compound to obtain a viscous liquid; and (3) neutralizing and drying the viscous liquid of step (2) to obtain the protein filling agent for leather use.

In step (1), 0.01-0.5 M of an inorganic acid solution may be used as an inorganic acid solution. The inorganic acid solution includes, but is not limited to, hydrochloric acid or sulfuric acid. The reducing agent includes sulfhydryl ethanol, sulfhydryl sodium acetate, $Na_2S_2O_3$, $NaHSO_3$, or, $Na_2SO_3$. Generally, the animal hairs are submerged in the inorganic acid solution and reducing agents. Preferably, the animal hairs are soaked in the inorganic acid and reducing agent for 10-48 hours, respectively. In one embodiment, the animal hairs are washed with water, and then soaked in a sufficient volume of 0.01-0.5 M inorganic acid solution for 10-48 hours. Subsequently, the animal hairs are washed with water until the animal hairs have a neutral pH level, and then the animal hairs are dried. 600 parts by weight of the animal hairs are soaked in a 2-30 wt % of reducing agent for 10-48 hours, and following water thereof is drained.

In step (2), the animal hairs are submerged in a 0.5-20 wt % of alkaline solution. Next, hydrolysis can be carried out at 50-95° C. for 2-20 hours. In one embodiment, the pre-treated animal hairs is added to a reactor with a stirrer, thermometer, and reflux condenser and treated with a sufficient volume of 0.5-20 wt % of alkaline solution at 50-95° C. for 2-20 hours to obtain a viscous liquid. In another embodiment, the alkaline solution can be anyone of MgO, CaO, NaOH, KOH, $Na_2CO_3$, or $NaHCO_3$.

In step (3), the pH level is adjusted to a pH 5-8 in a neutralizing process. In one embodiment, after cooling the viscous liquid, the pH level is adjusted to 5-8 by an inorganic solution to obtain a 10-20% solid content filtrate with keratin. Additionally, the filtrate is concentrated and dried to obtain the protein filling agent for leather.

The protein filling agent of the invention is more suitable for leather use than that prepared by raw hair, because the strength of the hair obtained from hair-saving dehairing processes is less than that of raw hair. Moreover, the method of the invention is also suitable for applying the waste cattle hairs from hair-saving dehairing processes. Since, the waste cattle hairs do not have a superior spinnability and intensity, the waste cattle hairs generally cannot be reused. Thus, the recycling of animal hairs merely focuses on wools and pig hairs. In contrast, the invention solves the conventional problems and provides a method to reuse all animal hairs.

Tanning Method

The protein filling agents of the invention can be used to fill and re-tan the hides and obtain qualified hide product.

Because the strength of the animal hairs obtained from hair-saving dehairing process is less than that of raw animal hairs, hides prepared by the protein filling agents of the invention, may be easily stained, have compact surfaces, have softness, and have flexibility.

The embodiments herein provide an illustration of the invention and should not be construed to limit the scope of the invention. Those skilled in the art should readily recognize that many other embodiments are encompassed by the invention. Meanwhile, unless otherwise indicated, all compositions are represented by part by weight.

EXAMPLE

Example 1

600 g of cattle hairs were obtained from hair-saving dehairing process. The cattle hairs were washed with water and soaked in 1200 g of 0.01 M hydrochloric acid solution for 48 hours. The cattle hairs were then washed with water until the cattle hairs had a neutral pH level. The water was drained from the cattle hairs and then the cattle hairs were soaked in 3000 ml of 30 wt % $NaS_2O_3$ for 48 hours. Subsequently, the treated cattle hairs were dried and added to a reactor with a stirrer, thermometer, and reflux condenser and treated with 3000 ml of 0.5 wt % NaOH for 20 hours at 95° C. to obtain a viscous liquid. When the viscous liquid was cooled, the pH level of the viscous liquid was adjusted to 5 by a sulfuric acid solution to obtain a 3200 ml of a hydrolysis solution containing 20% solid content. After drying, a protein filling agent for leather was obtained.

Example 2

600 g of wool obtained from hair-saving dehairing process was washed with water and soaked in 1000 g of a 0.5 M sulfuric acid solution for 10 hours. The wool was then washed with water until the wool had a neutral pH level. After drying, the wool was soaked in 2000 ml of 15 wt % sulfhydryl ethanol and 12 wt % sulfhydryl sodium acetate for 10 hours. Subsequently, the treated wool was dried, and then added to a reactor with a stirrer, thermometer, and reflux condenser and treated with 2000 ml of 12 wt % $Na_2CO_3$ and 7 wt % $NaHCO_3$ for 2 hours at 70° C. to obtain a viscous liquid. When the viscous liquid was cooled, the pH level of the viscous liquid was adjusted to 7 by a hydrochloric acid solution to obtain 1800 ml of a hydrolysis solution containing 20% solid content. After drying, a protein filling agent for leather was obtained.

Example 3

600 g of pig hairs obtained from hair-saving dehairing process were washed with water and soaked in 1500 g of a 0.3 M hydrochloric acid solution for 24 hours. The pig hairs were then washed with water until the pig hairs had a neutral pH level. After drying, the pig hairs were soaked in 2500 ml of 2 wt % $Na_2CO_3$ for 30 hours. Subsequently, the treated pig hairs were dried and then added to a reactor with a stirrer, thermometer, and reflux condenser and treated with 2500 ml of 20 wt % KOH for 6 hours at 50° C. to obtain a viscous liquid. When the viscous liquid was cooled, the pH level of the viscous liquid was adjusted to 8 by a hydrochloric acid solution to obtain 2600 ml of a hydrolysis solution containing 15% solid content. After drying, a protein filling agent for leather was obtained.

Property:
1. The Protein Filling Agent Prepared by Example 1
1.1 Yield: 210 g
1.2 Property:
(1) Appearance: brown powder
(2) Crude protein: 70-80%
(3) pH (1% aqueous solution): 5.5-6.5
(4) Water content: 5-10%
(5) Ash content: 15-20%
1.3 Application:
The protein filling agent prepared by Example 1 was used to form an upper leather portion of a shoe.
(1) Condition
Retanning: liquid ratio: 2.0; temperature: 35° C. 4% of a chrome tanning agent and 3% of an organic re-tanning agent were added and mixed for 1 hour. After mixing, the mixture was left to stand overnight.
Neutralization: 1.5% of sodium formate and 0.4% of sodium bicarbonate were added and mixed for 1 hour. Then, 5% of a hair protein powder was added and mixed for 1 hour.
Staining and fatliquoring: liquid ratio: 1.0; temperature: 50° C. 2.5% of a black dye and 10% of a fatliquoring agent were added and mixed for 1.5 hours. Then, 1% of a formic acid was added and then washed with water.
(2) Effect
The appearance of the leather was a soft elastic appearance with rich color, and the leather was easily stained. After staining, the wastewater was clear without color. The finished product, an upper leather portion of a shoe, met China's leather industry's QB/T1873-2004 standard requirement.
1.4 Environment Assessment
Compared with the hair-destroying processes, the wastewater of the hair-saving dehairing resulted in a 60% decrease for COD content (national standard method GB11914-89), an 80% decrease for nitrogen content (national standard method GB/T5009.5-1985), and a 30% decrease for sulfur content (iodimetric methods).
2. The Protein Filling Agent Prepared by Example 2
2.1 Yield: 230 g
2.2 Application
The protein filling agent prepared by Example 2 was used to form an upper leather portion of a shoe.
(1) Condition
Retanning: liquid ratio: 2.0; temperature: 35° C. 4% of a hair protein powder, 1.5% of a chrome tanning agent, and 2% of an organic re-tanning agent were added and mixed for 2 hour. After mixing, 0.8% of formic acid was added and then the mixture was left to stand overnight.
The next morning, 1.5% of sodium formate and 0.2% of sodium bicarbonate (pH 4.5-4.7) were added.
Staining and fatliquoring: liquid ratio: 1.5; temperature: 45° C. 3% of a black dye and 10% of a fatliquoring agent were added and mixed for 1.5 hours. Then, 0.6% of formic acid was added and then washed with water.

(2) Effect
The appearance of the leather was a soft elastic appearance with rich color, and the leather was easily stained. The finished product, an upper leather portion of a shoe, met China's leather industry's QB/T1873-2004 standard requirement.
3. The Protein Filling Agent Prepared by Example 3
3.1 Yield: 220 g
3.2 Application
The protein filling agent prepared by Example 3 was used to form an upper leather portion of a shoe.
(1) Condition
Protein powder was used in combination with fatliquoring agent.
Staining and fatliquoring: liquid ratio: 1.5; temperature: 60° C. 5% of a protein powder and 10% of a fatliquoring agent were added and mixed for 1 hour. 1.5% of a deep black dye was added and mixed for 0.5 hour. Then, 1% of a formic acid was added and then washed with water.
(2) Effect
The appearance of the leather was a soft elastic appearance with rich color, and the leather was easily stained. The finished product, an upper leather portion of a shoe, met China's leather industry's QB/T1873-2004 standard requirement.

INDUSTRIAL APPLICATION

1. The hair-destroying dehairing process is replaced with hair-saving dehairing process to reduce the wastewater pollution and facilitate wastewater treatment.
2. The invention provides a simple process for recycling animal hairs. The animal hairs are processed to form a protein filling agent for leather. Not only the waste pollution is solved, but also the value-added of the product is improved to increase the economic benefit.
3. The protein filling agent of the invention showed good performance when used to fill and re-tan hides. It does not affect the staining, and provides an excellent application.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A method for manufacturing a protein filling agent for leather utilizing animal hairs, comprising the steps of:
(1) pre-treating the animal hairs to obtain pre-treated animal hairs, wherein the pre-treating comprises washing the animal hairs with water, soaking the animal hairs in a sufficient volume of 0.01-0.5 M of inorganic acid solution for 10-48 hours, washing the animal hairs with water until the animal hairs have a neutral pH level, obtaining 600 part by weight of the animal hairs to soak in a sufficient volume of 2-30 wt % of reducing agent for 10-48 hours; and draining off the water from the animal hairs, subsequently;
(2) adding the pre-treated animal hairs of the step (1) to a reactor with a stirrer, thermometer, and reflux condenser to soak in a sufficient volume of 0.5-20 wt % of alkaline solution at 50-95° C. for 2-20 hours to obtain a viscous liquid; and
(3) cooling the viscous liquid of the step (2) and adjusting the pH level to 5-8 by an inorganic solution to obtain a filtrate of 10-20% solid content with keratin, and concentrating and drying the filtrate to obtain a protein filling agent for leather.

2. The method as claimed in claim 1, wherein the animal hairs are obtained by a hair-saving dehairing process.

3. The method as claimed in claim 1, wherein the animal hairs comprise cattle hairs, wools, or pig hairs.

4. The method as claimed in claim 1, wherein the animal hairs are cattle hairs.

5. The method as claimed in claim 1, wherein the inorganic acid of the step (1) comprises hydrochloric acid or sulfuric acid.

6. The method as claimed in claim 1, wherein the reducing agent of the step (1) comprises at least one of sulfhydryl ethanol, sulfhydryl sodium acetate, $Na_2S_2O_3$, $NaHSO_3$, or $Na_2SO_3$.

7. The method as claimed in claim 1, wherein the alkaline compound of the step (2) comprises at least one of MgO, CaO, NaOH, KOH, $Na_2CO_3$, or $NaHCO_3$.

8. A method for tanning hide, comprising filling and re-tanning the protein filling agent prepared by the method as claimed in claim 1 to form a hide.

* * * * *